April 19, 1960 L. E. ELFES ET AL 2,932,931
TILTING MEANS FOR A TRACTOR MOUNTED RECIPROCATING MOWER
Original Filed Aug. 5, 1954 4 Sheets-Sheet 1

INVENTORS.
Lee E. Elfes &
BY Leo J. Lorenz
Carlson, Pitzner, Hubbard & Woefe
Attorneys INVENTORS.
Lee E. Elfes &
Leo J. Lorenz
BY Carlson, Pitzner, Hubbard & Wolfe
Attorneys April 19, 1960 L. E. ELFES ET AL 2,932,931
TILTING MEANS FOR A TRACTOR MOUNTED RECIPROCATING MOWER
Original Filed Aug. 5, 1954 4 Sheets-Sheet 3

INVENTORS.
Lee E. Elfes &
BY Leo J. Lorenz
Carlson, Pitzner, Hubbard & Wolfe
Attorneys

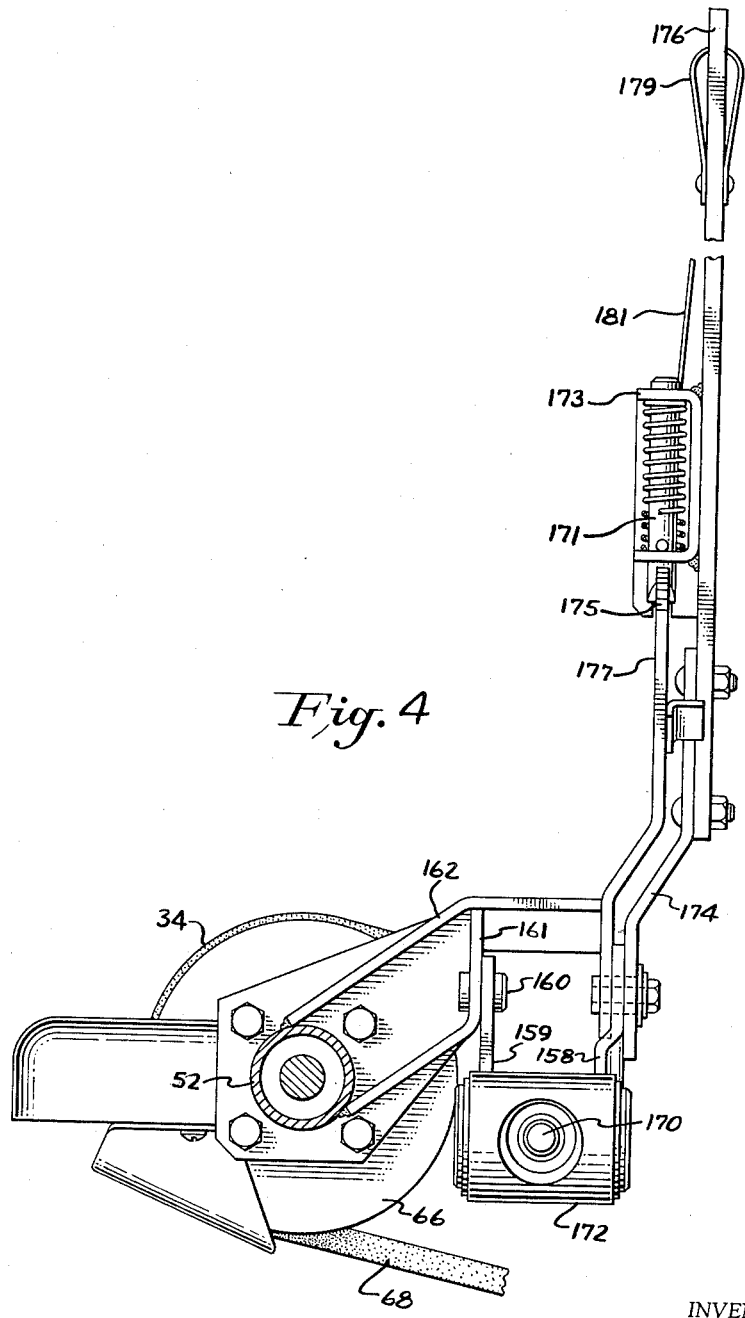

_United States Patent Office_

2,932,931
Patented Apr. 19, 1960

2,932,931

TILTING MEANS FOR A TRACTOR MOUNTED RECIPROCATING MOWER

Lee E. Elfes, Birmingham, and Leo J. Lorenz, Detroit, Mich., assignors to Massey-Ferguson Inc., a corporation of Maryland Original application August 5, 1954, Serial No. 447,984, now Patent No. 2,853,843, dated September 30, 1958. Divided and this application December 11, 1957, Serial No. 702,015

6 Claims. (Cl. 56—25)

The invention relates to tractor-operated mowers and more particularly mowers of the type adapted to be mounted on the body of a general purpose tractor and integrated with it so that the tractor and mower operate as a unitary machine.

This application is a division of our copending application Serial No. 447,984 filed August 5, 1954, now Patent 2,853,843.

One object is to provide improved means for adjusting the fore-and-aft tilt of the cutter bar.

A further object is to provide a mower of the above general character in which the various elements including the tilt adjusting mechanism are constructed and arranged for permanent assembly with the mower frame, thus providing a structure adapted for mounting on and removal from the tractor as a unit.

It is also an object of the invention to provide a mower embodying novel mechanism by which the fore-and-aft tilt of the cutter bar can be adjusted precisely and with complete safety while the mower is in operation.

Other objects and advantages of the invention will become apparent from the following detailed description of the preferred embodiment illustrated in the accompanying drawings, in which Figure 1 is a fragmentary plan view of a mower embodying the features of the invention, the mower being shown as mounted on a tractor.

Fig. 4 is a fragmentary transverse sectional view taken in a plane substantially on the line 4—4 of Fig. 2.

Figure 1:
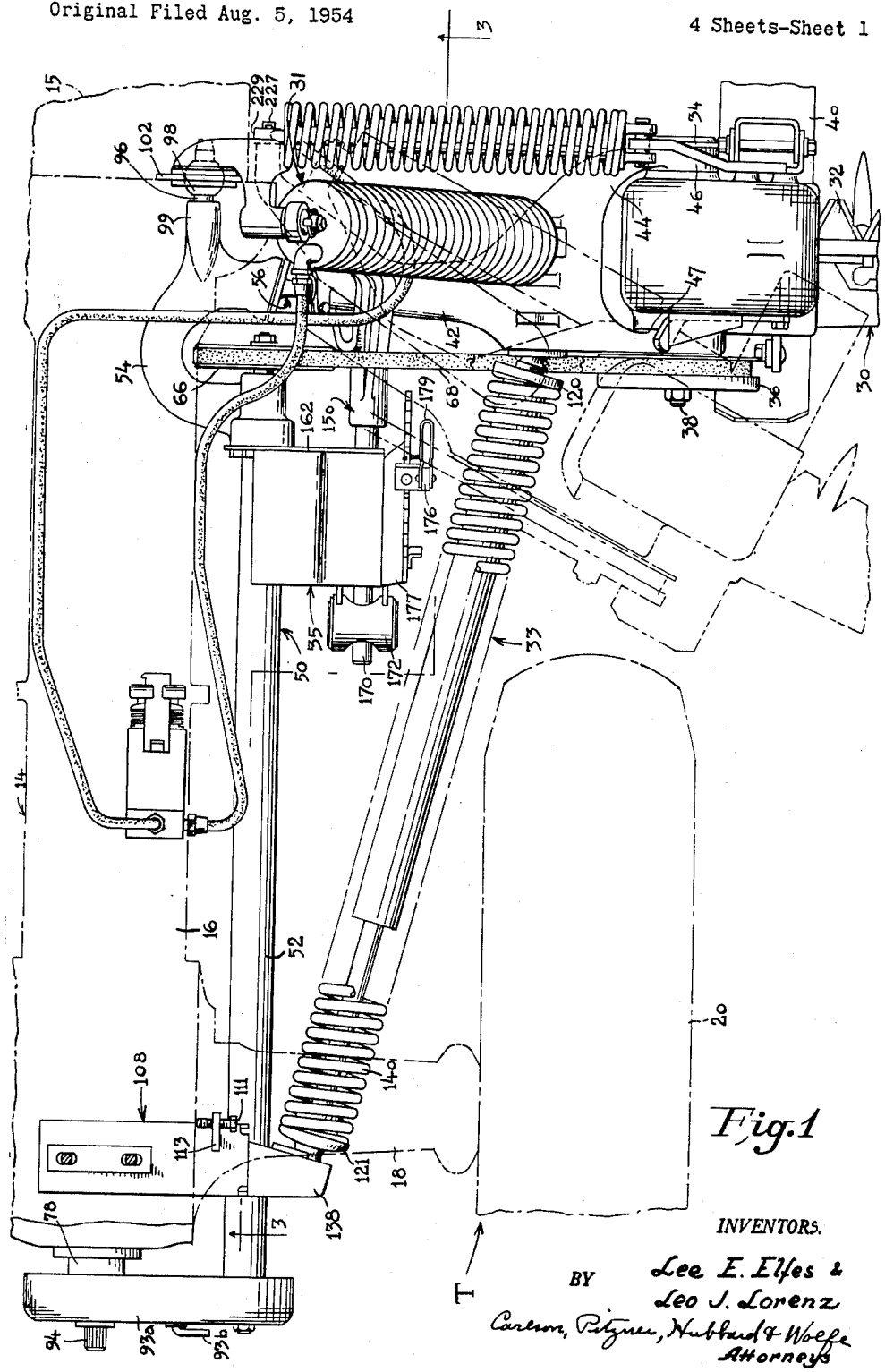

While the invention is susceptible of various modifications and alternative constructions, there is shown in the drawings and will be described in detail the preferred embodiment and an earlier form thereof, but it is to be understood that it is not thereby intended to limit the invention to the forms illustrated but it is intended to cover all modifications and alternative constructions falling within the spirit and scope of the invention as expressed in the appended claims.

By way of orientation in the art, the mower herein disclosed may, in general, be considered as an improvement on the side-mounted mower illustrated and described in an instruction manual entitled "Heavy Duty Mower P–EO–A 21—Operating and Assembly Instructions," published in 1949, by Harry Ferguson, Inc. of Detroit, Michigan. It is designed for mounting on a tractor T having means for supplying fluid under pressure for operating the cutter bar positioning means of the mower. When mounted on a tractor equipped with a hydraulically operated implement hitch, such as the "Ferguson" tractor, pressure fluid may be taken from the tractor hydraulic system. In the particular tractor illustrated provision is made for connection with the hydraulic system by interchanging a suitable fitting with a cover plate provided on the tractor center housing.

Figure 3:
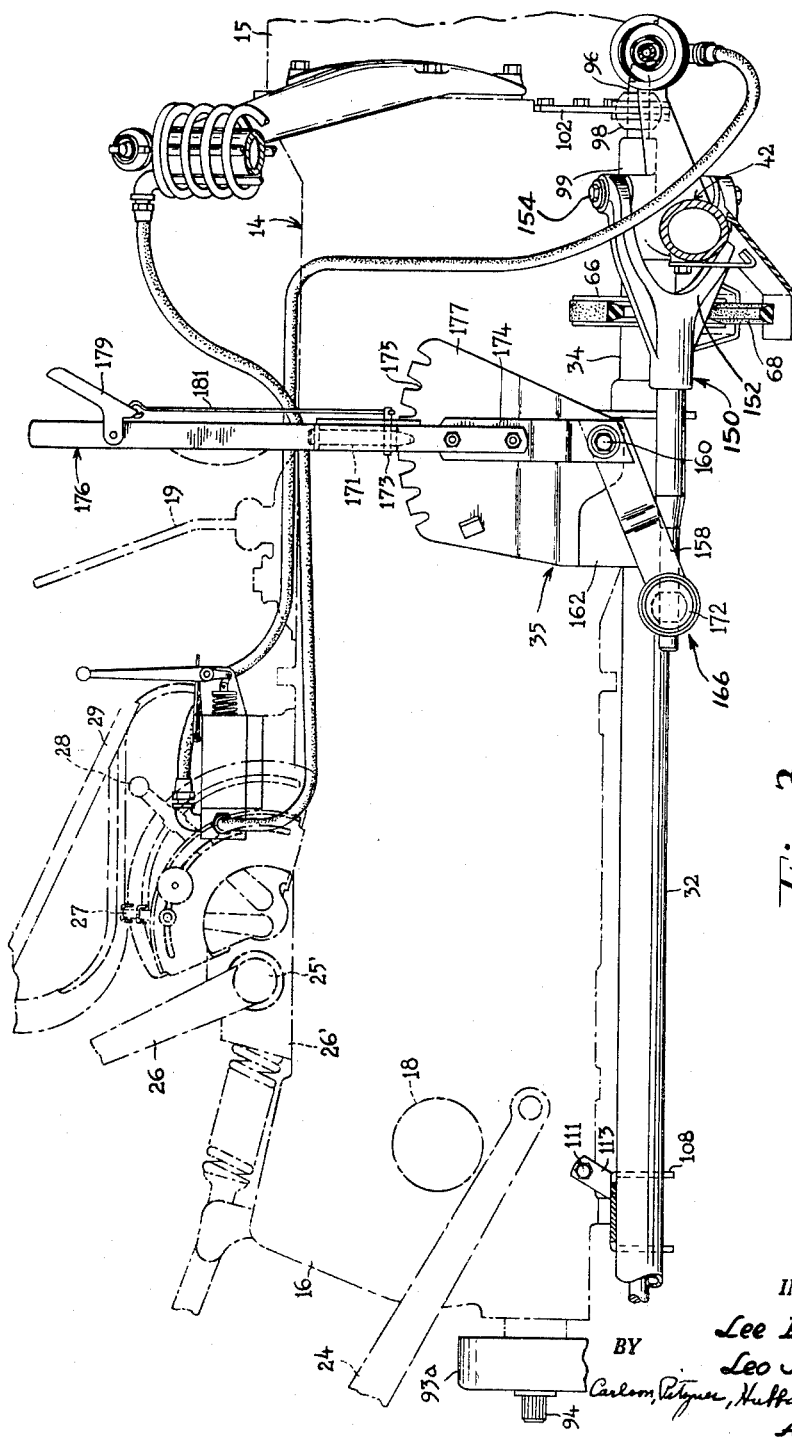
Fig. 3 is a fragmentary sectional view of the mower taken in offset vertical planes substantially on the line 3—3 of Fig. 1.

As an aid to understanding the problems involved in mounting a mower on and integrating it with a tractor, it will be well to consider briefly the general construction of the tractor. Referring to Fig. 1 of the drawings, the exemplary tractor has an elongated body 14 comprising an engine 15 and a center housing 16 assembled with the engine forward and joined as a rigid unitary structure by bolts inserted through mating flanges on the respective parts. Extending from opposite sides of the center housing adjacent its rear ends are axle housings 18 (Fig. 1) supporting the tractor's rear drive wheels 20. The wheels are driven from the tractor engine in a well-known manner through a selective change-speed transmission actuated by a manual shift lever 19 (Fig. 3).

Tractors of the type shown are equipped with a rear power take-off shaft 22 (Fig. 2) adapted to be driven from the tractor engine. The power take-off shaft projects rearwardly of the center housing and through a pad formed thereon which has suitable threaded holes for attachment of a cover or for the mounting of certain accessories with which the present invention is not concerned. When the mower is mounted on the tractor, the above-mentioned cover is removed for attachment of the mower drive mechanism to be described in another divisional application.

Trailingly pivoted on the center housing 16 are a pair of draft links 24 by which rear mounted implements are operatively coupled to the tractor. The draft links are raised and lowered by a hydraulic lift mechanism of well-known construction including a lift shaft 25' journaled on a cover plate 26' closing the upper part of the housing 16. Crank arms 26 fixed on opposite ends of the lift shaft are connected by suitable drop links with the respective draft links 24.

Control of the hydraulic system is effected through the medium of a pair of manually operable levers 27 and 28, the latter being the control lever while the lever 27 constitutes what may be termed a depth setter. By appropriate manipulation of those levers, the draft links may be selectively positioned and the hydraulic system conditioned for supplying fluid under pressure to the mower.

The improved mower is adapted to be mounted directly on the body of the tractor, that is, independently of the implement hitch linkage. The linkage is thus left free for attachment of other implements to the tractor which can be operated in the usual manner without requiring removal of the mower or alternatively can be retained on the tractor while the mower is operated alone. As an example, a side delivery rake or the like may be coupled to the tractor hitch linkage so that the operator can switch from mowing to raking or vice versa, as desired. It will be understood, of course, that the mower and the rake or other implement attached to the hitch linkage can be operated simultaneously if desired.

As in conventional mowers, the main operating element of the improved mower is an elongated cutter bar 30. The cutter bar is supported for pivoting movement about a fore-and-aft axis at the outer end of a drag bar 42 which, at its inner end, is supported for universal swinging and swiveling movements on a frame structure 50 mounted on the tractor. Power actuating means 31, in this instance hydraulically operated, is provided for swinging the cutter bar and the drag bar between their operating and inactive positions. Breakback mechanism 33 normally holds the cutter bar in laterally projecting relation to the tractor, as shown in full lines in Fig. 1, but permits it to swing rearwardly to the position shown in broken lines in case the cutter bar strikes an obstruction. Mechanism 35 is provided for rocking the drag bar and attached cutter bar about an axis transverse to the tractor to adjust the fore-and-aft tilt of the latter.

To obtain its broad objective of simplifying attachment and detachment, the major components of the mower referred to generally above, together with mechanism for driving the cutter bar from the power take-off shaft, are constructed and assembled to form a unitary structure adapted to be mounted on and dismounted from the tractor as a unit. In other words, the various elements of the mower are assembled and more or less permanently interconnected before they are mounted on the tractor and the assembly remains intact after removal of the tractor. This materially reduces the labor involved and shortens the time required for mounting and dismounting, and, in addition, insures proper interconnection and adjustment of the mower parts. Furthermore, handling and storage of the mower is simplified and loss or misplacement of parts is avoided.

Figure 2:
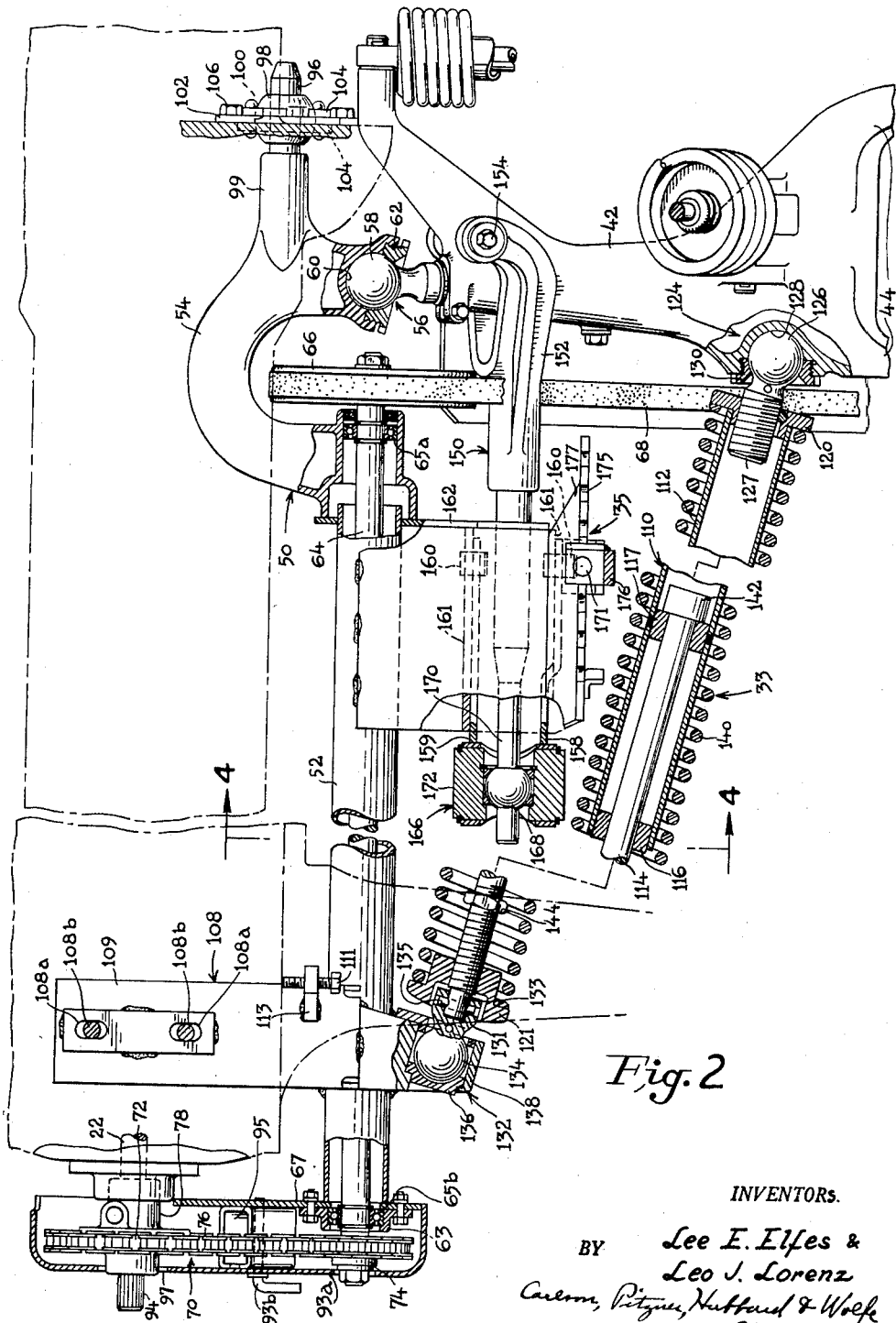
Fig. 2 is a fragmentary plan view of the device shown in Fig. 1 with parts omitted and other parts broken away and shown in section.

Turning now to a more detailed description of the exemplary mower and referring to Figs. 1 and 2 of the drawings, the cutter bar 30 may be of any preferred form, including the usual toothed knife 32 reciprocated by a driving head 34 to which the inner end of the bar is attached. The drivehead 34 likewise may be of any preferred character and as shown is adapted to receive power by way of a pulley 36 fixed on the projecting end of a shaft 38 journaled in the head. The head also carries a ground shoe 40 adapted to ride along the surface of the ground when the mower is in operation. It will be understood, of course, that the cutter bar may also be provided at its outer end with a conventional ground shoe which with the shoe 40 serves to hold the cutter bar clear of the ground.

As shown in Figs. 1 and 2, the cutter bar 30 is supported on the drag bar 42 through the medium of the drivehead 34. For this purpose the outer end of the drag bar is bifurcated to form a yoke 44 adapted to straddle the head and the latter is pivotally supported on the legs of the yoke as by front and rear trunnions 46 and 47. The shaft 38 is located coaxially of the trunnions so that the cutter bar and drivehead may be swung about their pivots on the drag bar without interfering with the drive.

The frame structure 50 constitutes the backbone of the mower and ties the elements together into a unitary structure, and, in addition, serves to support the major elements of the mower on the tractor. In its preferred form, the frame structure 50 comprises an elongated tubular rear member 52 rigidly joined to the rear leg of a U-shaped front member 54 disposed so as to open laterally of the rear member. Preferably, the drag bar 52 is mounted on the forward leg of the member 54 by a suitable joint 56 permitting universal swinging and swiveling of the bar. The joint 56, as shown, is a ball and socket joint comprising a ball element 58 (Fig. 2) fixed on or rigidly secured to the inner end of the drag bar and seated in an outwardly facing spherical socket 60 formed in the member 54. A retaining nut 62 threaded into the mouth of the socket retains the ball element therein.

The frame structure 50, as indicated above, supports the mechanism for driving the cutter bar from the tractor power take-off shaft which is characterized by its compactness and simplicity. Thus, the drive mechanism includes a shaft 64 extending axially through the tubular frame member 52 and journaled in front and rear bearings 65a and 65b (Fig. 2). The bearing 65a as shown is seated in a recess in the front frame member 54 disposed so as to aline the shaft 64 axially with the axis of the ball joint 56. Bearing 65b is carried in a retainer 63 bolted or otherwise secured to a heavy plate 67 fixed to the rear end of the frame member 52.

The shaft 64 projects into the space between the legs of the frame member 54 and on its projecting end carries a pulley 66 drivingly connected with the pulley 36 of the drivehead by a V-belt 68. It will be observed that the U-shaped form of the frame member 54 provides clearance for the pulley 66 and permits the shaft 64 to be coaxially alined with the axis of the ball and socket joint 56. Thus, as the drag bar and cutter bar are swung vertically about the joint 56, the distance between the pulleys 36 and 66 remains constant so that the tension of the belt is not affected nor the drive interfered with in any way.

It will also be noted that the improved drive mechanism imposes no restraint on the drag bar 42 so that the latter may swing rearwardly with the cutter bar as a unit when the latter strikes an obstruction. Moreover, it does not interfere with the limited rotation of the drag bar and cutter bar assembly to adjust the fore-and-aft tilt of the cutter bar.

Connection between the drive shaft 64 and the power take-off shaft 22 of the tractor is effected through the medium of a chain-type drive 70 (Fig. 2). As herein shown, the drive comprises a sprocket 72 on the power take-off shaft and a sprocket 74 on the shaft 64. A roller chain 76 drivingly connects the sprockets. As a safety precaution, the drive 76 is covered by a removable guard 93a. As shown in Fig. 2, the guard is clamped by a screw 93b to a spacing member 85 welded or otherwise secured to the rear face of the plate 67.

The unitary assembly of the mower elements with the frame 50 contributes substantially to the ease of mounting and dismounting the mower and those operations are further simplified and facilitated by the novel mode of attachment of the frame to the tractor. More particularly, provision is made for attaching the frame to the tractor at two points spaced apart fore and aft of the tractor, the attaching means comprising simple, easily applied attaching elements. Thus at the front end of the frame there is provided a connecting element in the form of a pin 96 adapted for engagement with a cooperating apertured element 98 permanently mounted on the body of the tractor. In the particular form of the frame illustrated, the pin 96 is suitably anchored in a boss 99 integral with and projecting forwardly from the frame member 54.

The apertured connecting element 98 is preferably in the form of a ball and is supported for free turning movement in a socket 100 formed in an apertured mounting bracket 102 and a pair of retaining plates 104 secured at opposite sides of the bracket. The bracket 102 may be conveniently secured to the tractor as by bolts 106 which are normally provided for joining the abutting flanges of the engine and the housing 16. The bracket projects only a short distance laterally of the tractor body and interferes in no way with the normal operation of the tractor. Accordingly, it may be left in place when the mower is dismounted so that remounting is further facilitated.

For attaching the rear portion of the frame 50 to the tractor, a laterally projecting bracket 108 is welded or otherwise secured to the frame member 52 adjacent its rear end. The bracket which may comprise a metal stamping is channel shaped in cross-section and is disposed in inverted position so as to present its upper face as a flat, horizontal bearing surface adapted to fit flush against a pad provided on the tractor center housing for mounting a swinging draw bar. Slots 108a in the bracket are spaced apart to receive the bolts 108b ordinarily supplied for attachment of the draw bar. The slots are elongated in a direction to permit lateral swinging of the frame about the axis of the ball 98 as a pivot after attachment of the bracket 108 to the tractor. Thus, the frame may be swung inwardly of the tractor to permit easy placement of the chain 76 over the sprockets 72 and 74 after which the frame can be swung outwardly to tension the chain. The bolts 108b, of course, are tightened when the frame is properly positioned and they, together with an adjusting screw 111, securely hold the frame in such position. As shown in Fig. 2, the adjusting screw is threaded through a lug 113 welded to the upper face of the bracket 108 and its inner end is disposed for engagement with an adjacent portion of the tractor center housing.

The breakback mechanism 33 which constitutes the subject matter of the instant application normally holds the cutter bar in correct operating position while permitting it to swing rearwardly when an obstruction is encountered. In its preferred form, it comprises a spring loaded compression member 110 connected between the drag bar 42 and the frame structure 50. As shown in Fig. 2, the compression member 110 comprises a pair of telescopingly assembled elements including an outer element in the form of a tube or cylinder 112 and an inner element or rod 114. The latter is disposed axially within the tube and is slidably supported in guide collars 116 and 117 fitted in the tube. Mounted on the telescoped elements 112 and 114 are front and rear plugs 120 and 121, the front plug being welded or otherwise rigidly fixed to the forward end of the tube 112 while the rear plug 121 has a threaded connection with the rod 114. The compression member is connected at its forward end to the drag bar 42 by connecting means 124, permitting universal pivotal movement between the parts. The connecting means as shown is of the ball and socket type comprising a ball 126 formed at the end of a stud 127 screw-threaded into the front plug 120. The ball is adapted to seat in a socket 128 formed in and opening rearwardly of the drag bar 42. A retainer nut 130 threaded into the mouth of the socket retains the ball in place.

A similar ball and socket connection 132 secures the other end of the compression member to the frame structure. As shown in Fig. 2, the connection comprises a ball 134 having an integral shank portion 131 apertured to receive the reduced end portion 133 of the rod 114. A cross pin 135 inserted through the shank and rod secures the parts together. The ball 134 seats in a spherical socket defined by a member 136 mounted in an extension 138 of the bracket 108 which, as previously explained, is fixed to and supports the tubular frame member 52 on the tractor housing.

Disposed around the telescopingly engaged members 112 and 114 is a coiled compression spring 140 having its ends abutting circumferential flanges on the front and rear plugs 120 and 121. Adjustment of the loading of the spring 140 may be effected by screwing the plug 121 along the rod 114. To limit extension of the telescoping members beyond the length required to locate the cutter bar in operating position, the rod 114 is formed at its forward end with an enlarged head 142 engageable with the guide sleeve 117 in the tube 112. Collapse or contraction of the telescoping elements is similarly limited by a stop nut 144 threaded on the rod 114 and engageable by the guide sleeve 116.

As indicated above, the unitary mower structure includes the tilt mechanism 35 for adjusting the fore-and-aft tilt of the cutter bar 30. In the exemplary mower, such adjustment is effected by rocking the drag bar 42 about its longitudinal axis on the ball and socket joint 56. For this purpose, a rearwardly extending, generally horizontal lever 150 is articulated to the drag bar. To accommodate rearward swinging of the drag bar and to make allowance for its generally downward inclination, the lever 150 has a pivotal connection with the drag bar. In the particular form shown, the forward end of the lever is bifurcated to define a yoke 152 adapted to straddle the drag bar and is pivotally connected to it by means of a bolt 154. As will be seen by reference to Fig. 3 of the drawings, the bolt is disposed transversely of the respective longitudinal axes of the drag bar and the lever 150 so that the drag bar may be rocked about its axis by raising or lowering the aft end of the lever.

Manually operable means is provided for rocking the lever 150 in a generally vertical direction for effecting the tilt adjustment. This means, as shown, comprises a pair of rigid links 158 and 159 disposed in spaced parallel relation on opposite sides of the lever 150 and pivoted at their forward ends by pins 160 to the depending flanges 161 of a bracket 162 welded or otherwise rigidly fixed to the frame 50 and projecting laterally therefrom. At their aft ends the links 158 and 159 are connected with the lever 150 for universal pivoting, swiveling and sliding movement by means of a universal connector 166 comprising, in this instance, an apertured ball 168 slidably positioned on a cylindrical extension 170 of the lever. The ball 168 is seated in a socket formed in a cage 172 rigidly secured to the respective links.

Welded or otherwise rigidly fixed to one of the links, in this instance the link 158, is an upwardly extending arm 174 to which a hand lever 176 is secured. As will be seen by reference to Fig. 3 of the drawings, the hand lever is disposed within easy reach of the driver occupying the seat 29. The hand lever is provided with suitable means for releasably locking it in selected positions of adjustment to retain the drag bar in a desired angular position. The latch means, as shown, comprises a latching pin 171 slidably supported for endwise movement in guides 173 provided on the hand lever. At its lower end the pin is tapered for engagement with notches 175 in a segmental locking plate 177 rigid with and extending upwardly along the outer side of the bracket 162. The latching pin is adapted to be moved between latching and release position by means of a grip lever 179 pivoted adjacent the upper end of the hand lever 176 and connected with the pin by a suitable link 181.

It will be evident that the forward swinging of the lever 176 will serve to rock the lever 150 upwardly and thereby swing the drag bar 42 clockwise about its longitudinal axis. Accordingly, the leading edge of the cutter bar will be tilted downwardly relative to the trailing edge. Conversely, when the hand lever is swung rearwardly, the drag bar will be rocked in the opposite direction and the leading edge of the cutter bar will be tilted upwardly. The cutter bar may be retained in any adjusted position by simply engaging the latch pin 171 in an appropriate notch in the locking segment 177.

It will be evident from the foregoing that a mower constructed in accordance with the invention presents substantial advantages over previous side-mounted mowers. The novel mounting of the drag bar and cutter bar assembly permits the cutter bar to be adjusted for fore-and-aft tilt in a simple, practical manner. The tilt adjusting mechanism itself is simple and rugged in construction. It is readily accessible to the tractor driver so that adjustments may be made quickly and safely even when the mower is in operation.

We claim as our invention:

1. In a mower attachment for a tractor or the like, the combination comprising a frame mountable at one side of the tractor, a drag bar, cooperating coupling elements on the drag bar and on the frame connecting one end of said drag bar to said frame for universal swinging and swiveling movement, a cutter bar carried at the other end of said drag bar, means interposed between the drag bar and the frame normally holding the drag bar and said cutter bar in laterally extending position relative to the frame, said holding means yielding to permit rearward swinging of the drag bar and cutter bar when the latter meets an obstruction, and means on said frame operable to rotate said drag bar about its longitudinal axis to adjust the fore-and-aft tilt of the cutter bar, said holding means having a universal joint connection with the drag bar effective to prevent the drag bar rotating means from interfering with the swinging movements of the drag bar.

2. In a mower attachment for a tractor or the like, the combination comprising a frame mountable at one side of the tractor, a drag bar, cooperating coupling elements on the drag bar and the frame connecting one end of said drag bar to said frame for universal swinging and swiveling movement, a cutter bar carried at the other end of said drag bar, means interposed between the drag bar and the frame normally holding the drag bar and said cutter bar in laterally extending position relative to the frame, said holding means yielding to permit rearward swinging of the drag bar and cutter bar when the latter meets an obstruction and having a universal joint connection with the drag bar to accommodate limited rotation of the bar about its longitudinal axis, a hand lever pivoted on said frame, and means operatively connecting said hand lever with said drag bar effective to rotate the drag bar about its longitudinal axis in response to the rocking of the lever on its pivot, said rotation of the drag bar serving to adjust the fore-and-aft tilt of said cutter bar.

3. In a mower attachment for a tractor or the like, the combination comprising a frame mountable at one side of the tractor, a drag bar, cooperating coupling elements on the drag bar and the frame connecting one end of said drag bar to said frame for universal swinging and swiveling movement, a cutter bar carried at the other end of said drag bar, means interposed between the drag bar and the frame normally holding the drag bar and said cutter bar in laterally extending position relative to the frame, said holding means yielding to permit rearward swinging of the drag bar and cutter bar when the latter meets an obstruction and having a universal joint connection with the drag bar to accommodate limited rotation of the bar about its longitudinal axis, a hand lever pivoted on said frame, and means operatively connecting said hand lever with said drag bar effective to rotate the drag bar about its longitudinal axis in response to the rocking of the lever on its pivot to adjust the fore-and-aft tilt of the cutter bar, said connecting means including a lever having a pivotal connection at one end with the drag bar and a universal sliding connection at the other end with said hand lever to accommodate swinging movements of the drag bar.

4. In a mower attachment for a tractor or the like, the combination comprising a frame mountable at one side of the tractor, a drag bar, cooperating coupling elements on the drag bar and the frame connecting one end of said drag bar to said frame for universal swinging and swiveling movement, a cutter bar carried at the other end of said drag bar, means interposed between the drag bar and the frame normally holding the drag bar and said cutter bar in laterally extending position relative to the frame, said holding means yielding to permit rearward swinging of the drag bar and cutter bar when the latter meets an obstruction and having a universal joint connection with the drag bar to accommodate limited rotation of the bar about its longitudinal axis, a hand lever pivoted on said frame, and means operatively connecting said hand lever with said drag bar effective to rotate the drag bar about its longitudinal axis in response to the rocking of the lever on its pivot to adjust the fore-and-aft tilt of the cutter bar, said connecting means including a lever pivotally connected at one end to the drag bar to swing about a generally upright axis, and a ball and socket device connecting the other end of said lever with said hand lever, said lever being slidable relative to said device to accommodate rearward swinging of the drag bar.

5. In a mower attachment for a tractor or the like, the combination comprising a frame, a drag bar, means including a ball and socket joint for mounting the drag bar in a laterally extending position on said frame to project at one side of the tractor for universal swinging and swiveling movement, a laterally extending cutter bar pivoted to the outer end of the drag bar for vertical swinging movement, yieldable means interposed between the drag bar and the frame normally holding the drag bar in a laterally extending position, said yieldable means permitting the drag bar to swing rearwardly about the ball and socket joint in the event the cutter bar should encounter an obstruction, a tilt-adjusting lever, a generally vertical pivot connecting the lever to the drag bar in trailing relation, said lever having an extension at its rear end, a manually adjustable rearwardly extending link, means for pivoting said link on the frame for swinging movement in a vertical plane, an apertured ball slidable along said extension, a socket member mounted on said link and engaging said ball for swinging said tilt-adjusting lever vertically and thereby swiveling the drag bar on the ball and socket joint so as to change the tilt of the cutter bar, said vertical pivot and said extension, of the cutter bar, said vertical pivot and said extension, said apertured ball and socket member being operative to accommodate the movements of said tilt adjusting lever resulting from rearward and upward swinging movements of the drag bar.

6. In a mower attachment for a tractor or the like having a frame mountable on the tractor, the combination comprising a cutter bar extending laterally from one side of the tractor, a drag bar connecting the inner end of the cutter bar to the frame for universal swinging and swiveling movement, yieldable means interposed between the drag bar and the frame normally holding the cutter bar in a laterally extending position but permitting the cutter bar to swing rearwardly when it encounters an obstruction, a manually adjustable rearwardly extending link for adjusting the tilt of the cutter bar, means for pivoting said link on the frame for vertical swinging movement, a rearwardly extending lever trailingly pivoted to the drag bar for swinging movement from side to side to accommodate rearward swinging movement of the drag bar and cutter bar, said lever having an extension at its rear end, and a ball and socket joint connecting said extension to said rearwardly extending link whereby the manually adjustable link will be operative to swing the lever vertically and thus rock the drag bar about its longitudinal axis to change the tilt of the cutter bar, the extension and ball and socket joint being operative to accommodate movements of the lever resulting from rearward and upward swinging movements of the cutter bar.

References Cited in the file of this patent

UNITED STATES PATENTS

| | | |
|---|---|---|
| 1,973,993 | Pearson | Sept. 18, 1934 |
| 2,580,266 | Abgarian | Dec. 25, 1951 |
| 2,628,467 | Gillespie | Feb. 17, 1953 |
| 2,637,966 | Richey | May 12, 1953 |